US006532527B2

(12) United States Patent
Selkirk et al.

(10) Patent No.: US 6,532,527 B2
(45) Date of Patent: Mar. 11, 2003

(54) USING CURRENT RECOVERY MECHANISMS TO IMPLEMENT DYNAMIC MAPPING OPERATIONS

(75) Inventors: Stephen S. Selkirk, Broomfield, CO (US); Charles A. Milligan, Golden, CO (US)

(73) Assignee: Storage Technology Corporation, Louisville, CO (US)

( * ) Notice: Subject to any disclaimer, the term of this patent is extended or adjusted under 35 U.S.C. 154(b) by 51 days.

(21) Appl. No.: 09/800,714

(22) Filed: Mar. 8, 2001

(65) Prior Publication Data

US 2001/0056525 A1 Dec. 27, 2001

Related U.S. Application Data

(60) Provisional application No. 60/212,260, filed on Jun. 19, 2000.

(51) Int. Cl.[7] .............................................. G06F 17/30
(52) U.S. Cl. ..................... 711/203; 711/161; 711/162; 711/165; 711/202

(58) Field of Search ............................ 711/4, 111–114, 711/161, 162, 203, 165, 202; 707/204; 714/710, 711

(56) References Cited

U.S. PATENT DOCUMENTS

| 5,410,667 | A | * | 4/1995 | Belsan et al. ............... 707/205 |
| 6,038,639 | A | * | 3/2000 | O'Brien et al. ............. 711/114 |
| 6,078,932 | A | * | 6/2000 | Haye et al. ................. 707/204 |
| 6,189,015 | B1 | * | 2/2001 | Reed et al. .................. 707/100 |
| 6,212,531 | B1 | * | 4/2001 | Blea et al. ................... 707/204 |

* cited by examiner

Primary Examiner—Than Nguyen
(74) Attorney, Agent, or Firm—Carstens, Yee & Cahoon, L.L.P.

(57) ABSTRACT

A method for using existing internal mapping mechanisms to dynamically map data in a computer storage subsystem is provided. The invention comprises using a dynamic mapping mechanism to mark (e.g., via a D-Mark) a data location and then using pointers to direct write requests for the data location to a side file. The new data is then written in the side file and a housekeeping operation reconciles the old and new data locations.

20 Claims, 12 Drawing Sheets

USING CURRENT RECOVERY MECHANISMS TO IMPLEMENT DYNAMIC MAPPING OPERATIONS

CROSS REFERENCE TO RELATED APPLICATIONS

This application claims the benefit of the filing date of corresponding U.S. Provisional Patent Application No. 60/212,260, entitled "System for providing a policy-based demand and use of functions like virtual volumes, instant copy, RAID, etc.", filed Jun. 19, 2000. In addition, the present invention is related to applications entitled A SYSTEM TO SUPPORT DYNAMICALLY FLEXIBLE DATA DEFINITIONS AND STORAGE REQUIREMENTS, Ser. No. 09/751,635, EFFECTING INSTANT COPIES IN A DYNAMICALLY MAPPED SYSTEM, Ser. No. 09/884,294, DYNAMICALLY CHANGEABLE VIRTUAL MAPPING SCHEME; Ser. No. 09/751,772, RECOVERY OF DYNAMIC MAPS AND DATA MANAGED THEREBY; Ser. No. 09/752,253, FLOATING VIRTUALIZATION LAYERS, Ser. No. 09/752,071, and SELF DEFINING DATA UNITS, Ser. No. 09/751,641, filed on Dec. 29, 2000, assigned to the same assignee, and incorporated herein by reference.

BACKGROUND OF THE INVENTION

1. Technical Field

The present invention relates generally to an improved data processing system and in particular to a data storage subsystem for use with a data processing system. Still more particularly, the present invention provides a method for dynamic mapping of operations in a data processing storage subsystem.

2. Description of Related Art

In computer systems and data storage subsystems, one problem is introducing new physical storage devices into a subsystem for management. Another problem is to manage existing physical storage using new allocations to new sets of users. A third problem is performing a data file copy operation in a manner that minimizes the amount of time before the operation is completed and also minimizes the use of processing resources and data storage memory. Such copies are called 'point in time' or 'instant' or snapshot copies (snaps). The ability to introduce and use a new storage device in a storage system is improved when the mechanism for the host to address the storage space is mapped through one of the existing virtualization mechanisms that storage system venders currently support. Virtualization allows the host system to see one description of the storage space and for that description to be mapped to a completely different physical structure of the storage space. Using virtualization (sometimes called logical device mapping) to map what the host understands (often called the virtual device) allows the physical space to be changed without changing the host virtual images. Likewise, when the host wants to change the virtual mapping and allocate storage space to different applications in a new way, the virtualization allows that to proceed without having to make corresponding changes in the physical storage structures. One of the mechanisms used to accomplish virtualization is to use a system of pointers. Using pointers also allows one to address the third problem mentioned above.

Previously, data files were copied in their entirety by the processor, such that two exact copies of the selected data file were resident in the data storage memory. This operation consumed twice the amount of memory for the storage of two identical copies of the data file. Additionally, this operation required the intervention of the processor to effect the copy of the original data file.

A data file snapshot copy is an improvement over this type of copy process. This snapshot copy process includes a mapped virtual data storage subsystem using pointers. This subsystem stores data received from a processor in back-end data storage devices by mapping the processor assigned data identifier to a logical address that identifies the physical storage location of the data. This mapped virtual data storage subsystem performs a copy of a subset of this data by creating a duplicate set of data pointers to the data and linking this to an identifier in a mapping table to reference the original data. In this mapped virtual data storage subsystem, the data is often organized in a collection (sometimes called a data file, a data set, or a logical unit number or LUN) which is recognized by or referred to as a set of "virtual tracks" and each data file is identified by unique virtual track addresses (VTAs). The use of a mapping table provides the opportunity to replace the process of copying the entirety of a data file in the physical data storage devices with a process that manipulates the contents of the mapping table. A data file appears to have been copied if the name used to identify the original data file and the name used to identify the copy data file are both mapped to the same physical data storage location coupled with the ability to change only one (or the other) with the changes being specifically localized only to the data file being changed.

This mechanism enables the processor to access the data file via two virtual addresses while only a single physical copy of the unchanged data file resides on the back-end data storage devices in the data storage subsystem. This process minimizes the time required to execute the copy operation and the amount of memory used since the copy operation is carried out by creating a new pointer to the original data file and does not require any copying of the data file itself.

System administrators are beginning to realize that the benefits of virtualization in introducing new physical devices into use and mapping storage space for new sets of users and also "point in time" or "instant" copies of data are extremely useful. However, the system administrator has to specifically plan for and request execution of these copies at the host level, such as setting up mirrored volumes or using the snapshot commands available in virtual mapping subsystems.

In addition, when attempting to provide the benefits of virtualized data storage, some type of mapping scheme is required. One of the problems with some of the existing mapping schemes is the additional processing overhead needed to process the mapping algorithm or following the mapping pointers to find the location of the desired data. Some of the mapping schemes force the manipulation of many pointers in order to perform operations on large sets of mapped data. Some mapping schemes also force the allocation of mapping tables for all possible virtual addresses whether or not those addresses are actually used.

Therefore, it would be desirable to have a method that provides for an arbitrarily larger amount of data storage with algorithmic access to most of the storage space, without expending the computational resources needed to manage the permanent, larger mapping tables for the whole data space.

SUMMARY OF THE INVENTION

The present invention provides a method for using recovery mechanisms to dynamically map data in a computer storage subsystem. The invention comprises using a dynamic mapping mechanism to mark (D-Mark) a data location and then using pointers to direct write requests for the data location to a side file. The new data is then written in the side file and a housekeeping operation reconciles the old and new data locations.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
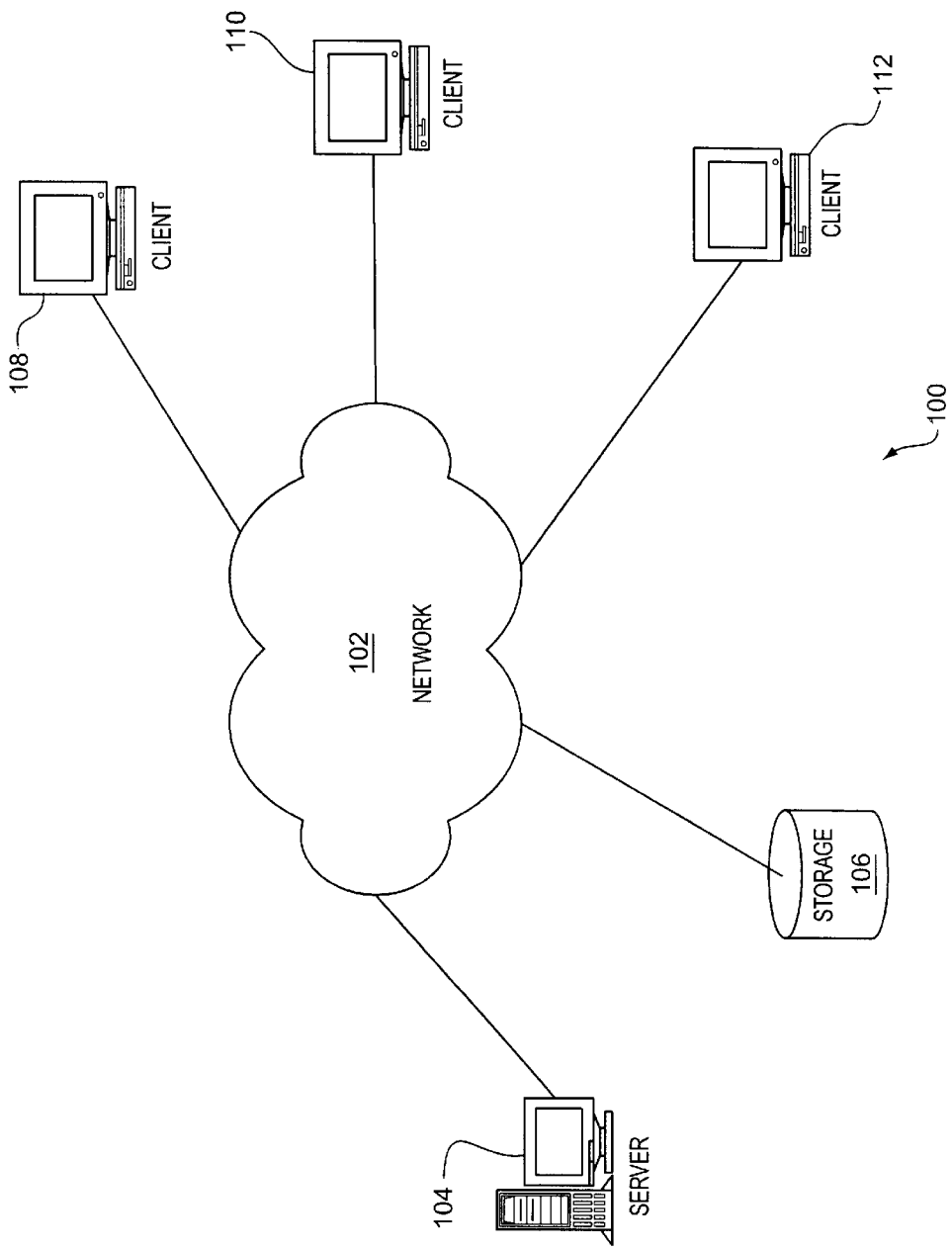
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage subsystem 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. Distributed data processing system 100 may be implemented as one or more of a number of different types of networks, such as, for example, an intranet, a local area network (LAN), or a wide area network (WAN). Network 102 contains various links, such as, for example, fiber optic links, packet switched communication links, enterprise systems connection (ESCON) fibers, small computer system interface (SCSI) cable, wireless communication links. In these examples, storage subsystem 106 may be connected to server 104 using ESCON fibers. FIG. 1 is intended as an example and not as an architectural limitation for the present invention.

Figure 2:
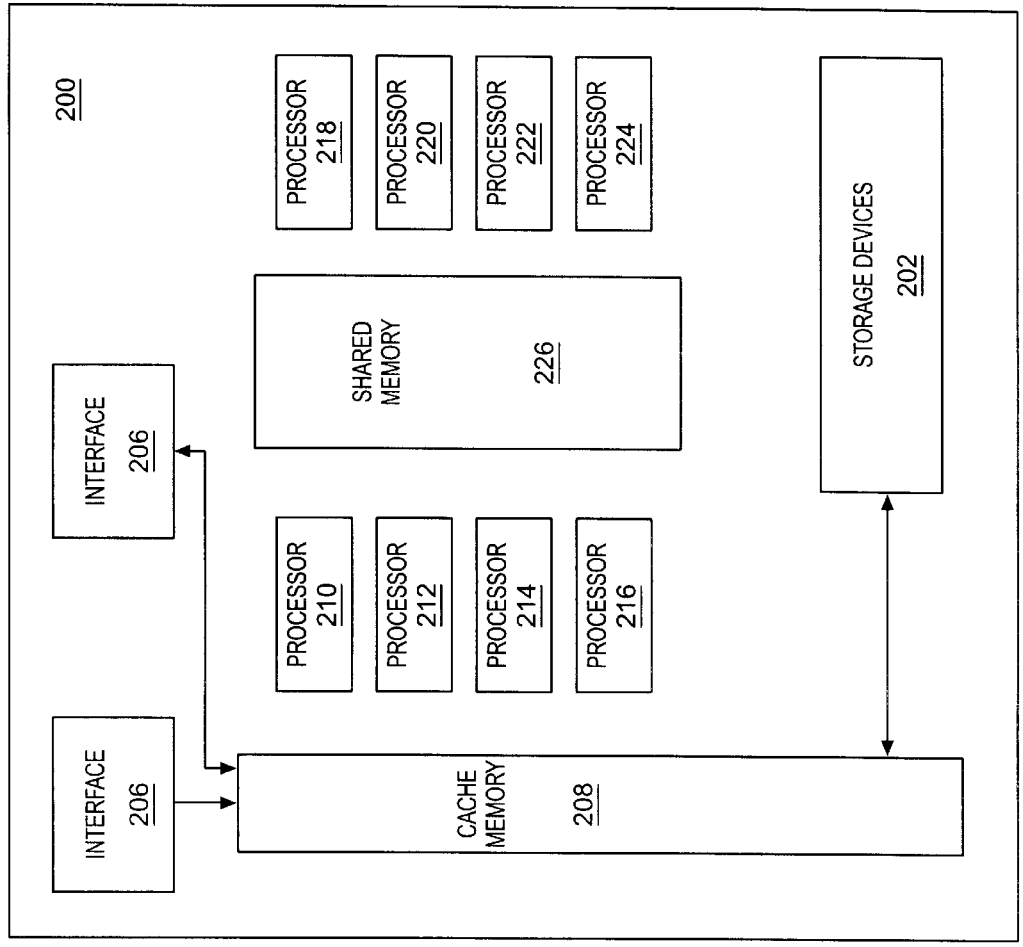
FIG. 2 is a block diagram of a storage subsystem in accordance with a preferred embodiment of the present invention.

Turning next to FIG. 2, a block diagram of a storage subsystem is depicted in accordance with a preferred embodiment of the present invention. Storage subsystem 200 may be used to implement storage subsystem 106 in FIG. 1. As illustrated in FIG. 2, storage subsystem 200 includes storage devices 202, interface 204, interface 206, cache memory 208, processors 210–224, and shared memory 226.

Interfaces 204 and 206 in storage subsystem 200 provide a communication gateway through which communication between a data processing system and storage subsystem 200 may occur. In this example, interfaces 204 and 206 may be implemented using a number of different mechanisms, such as ESCON cards, SCSI cards, fiber channel interfaces, modems, network interfaces, or a network hub. Although the depicted example illustrates the use of two interface units, any number of interface cards may be used depending on the implementation.

In this example, storage subsystem 200 is a shared virtual array. Storage subsystem 200 is a virtual storage system in that each physical storage device in storage subsystem 200 may be represented to a data processing system, such as client 108 in FIG. 1, as a number of virtual devices. In this example, storage devices 202 are a set of disk drives set up as a redundant array of inexpensive disks (RAID) system. Of course, other storage devices may be used other than disk drives. For example, optical drives may be used within storage devices 202. Further, a mixture of different device types may be used, such as, disk drives and tape drives.

Data being transferred between interfaces 204 and 206 and storage devices 202 are temporarily placed into cache memory 208. Additionally, cache memory 208 may be accessed by processors 210–224, which are used to handle reading and writing data for storage devices 202. Shared memory 226 is used by processors 210–224 to handle and track the reading and writing of data to storage devices 202.

The present invention manages virtual storage facilities comprising an organization of computer equipment, for example, a host network, data transfer means, storage controller means, permanent storage means and attachment means connecting these devices together. The data storage facilities also may include management information associated with data units such that the management information provides an inventory of capabilities with upper and lower boundaries that may limit the options available to store the data and still meet a user's criteria. For purposes of this application, a data unit is a logical entity known to a owning entity that is composed of a number of data elements and meta-data and a data element is a grouping of data bits or bytes that the subsystem chooses to manage as a consistent set. Such management information may be independent of attributes of or characteristics of the devices in the physical storage subsystem actually used to store the data elements, but may consist of imputed associations with those attributes through, for example, changeable rule sets, processes or algorithms. These rule sets, processes or algorithms may be changed by user demand or via processes, that may monitor data unit usage and manipulation. The storage of data elements may be adjusted to comply with modifications in the, for example, rules sets, processes or algorithms.

In addition, the present invention may include such management information processing with respect to storage device attributes which may include, for example, empirically derived relationships that may infer boundaries, explicitly stated relationships that may stipulate boundaries, relationships that may exist only on demand and combinations of standard storage subsystem relationships such as, for example, RAID in all its forms and hierarchical storage management (HSM) in all its forms. Also, relation of the management information and the subsystem device attributes may be modified resulting in the storage of the data units having to be adjusted in which such a change of relations between the management information and the subsystem attributes include encapsulated logic. The relation between the management information and the subsystem device attributes may also include attributes of implied storage devices not present in the physical subsystem. The relation between the management information and the subsystem device attributes may also include apparently mutual exclusive sets of criteria, for example, criteria satisfied by multiple instances of data storage and criteria satisfied by storage of data at multiple layers on the storage subsystem. The relation between the management information and the subsystem device attributes may also be conditionally applied, such as, for example, between a specified criteria and a default criteria and between a plurality of specified criteria.

Figure 3:
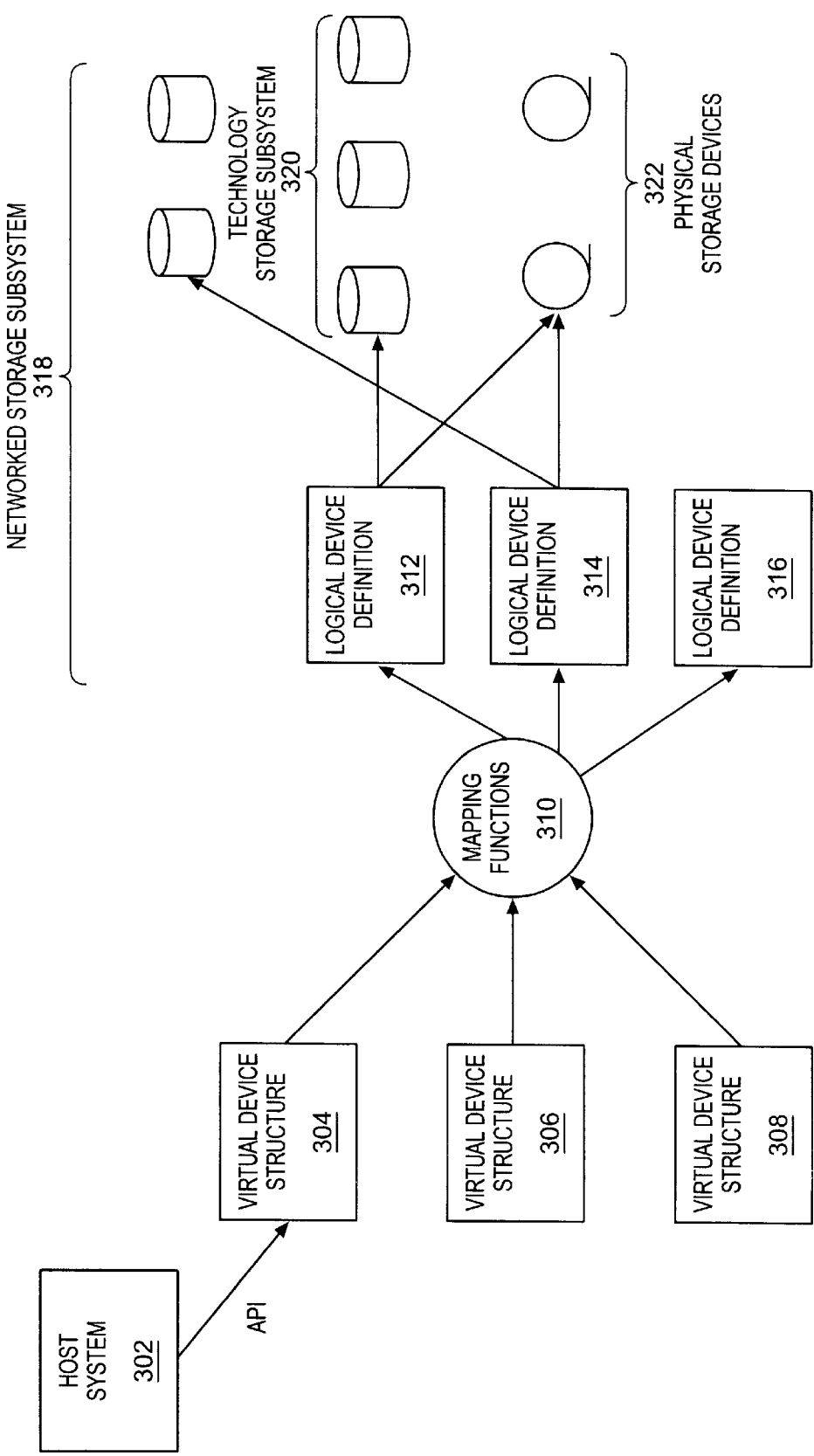
FIG. 3 is an exemplary block diagram of the conceptual relationship between the virtual device structures and the logical device structures in accordance with a preferred embodiment of the present invention.

FIG. 3 is an exemplary block diagram of the conceptual relationship between the virtual device structures and the logical device structures in accordance with a preferred embodiment of the present invention. The present invention provides a subsystem level application program interface (API) 312 from host system 302 which allows a user to construct data unit definitions or virtual devices. These data unit definitions or virtual devices, such as, for example, virtual device structures 304, 306 and 308, may be called "Virtual Device Structures" (VDS). A subsystem in turn will implement logical device structures with mapping functions 310 and mapping VDSs into the physical world managed by the subsystem. The data may be mapped into networked storage subsystem 318 which may consist of logical definitions 312, 314 and 316. Networked storage subsystem 318 may also consist of storage units 324 and 326 in which the data is stored. Also, data may be stored in technology storage subsystem 320 which may be a RAID and in physical storage devices 322. VDSs may be defined by requesting the use of performance structures like striping, redundancy structures like mirroring and demand copies, and location structures like remote location of copies or archive copies, either alone or in combination. These VDSs also may have scheduling and synchronizing information that allow complete policies to be defined within the structure. Multiple technology selections may also be used, for example, disk and tape in the same virtual device structure. The ability to modify structure rules and the ability to adjust already stored data to the new rules is also provided. A VDS may include a subsystem virtual device definition table which may consist of, for example, the following:

Virtual Definition 1
  Performance Requirements
    a) sustainable data transfer rate
    b) sustainable start input output (SIO) commands per second
    c) parallel SIO
  Availability Requirements
    a) time to first accessibility of data
    b) time to hold off new users for consistency checks
  Reliability Requirements
    a) allowed probability of data block loss
    b) allowed probability of data file loss
  Capacity Management Requirements
    a) maximum size of data unit The definition of Performance requirements, Availability requirements, Reliability requirements and Capacity Management requirements (PARC) for each data unit is available to the owning entity to interpret and to modify the entity. The owning entity may:

1) share access to the data definition with or without the data;
2) allow the data definition to be associated with the data;
3) allow the data definition to be distributed with the data; and
4) make a copy of the definition and have more than one definition for the same data unit, wherein
  a) the copy process may modify one or more of the extant definitions and expect the subsystem to make the necessary changes so that the data unit will comply with all definitions;
  b) the copy process may distribute data units or portions thereof with selected definitions; and
  c) the copy process may distribute data units or portions thereof with selected subsets of the full definition.

Storage performance, availability, reliability and capacity systems (PARCs) are dynamic subsystems that support flexible definitions of data storage requirements at the data level. The present invention is based on providing a subsystem level application program interface (API) that allows a user to request or imply a demand for the use of data storage capabilities. Such data storage capabilities may be defined by requesting capabilities associated with data units that may invoke the use of performance structures like, for example, striping, redundancy structures like mirroring and demand copies, and location or availability structures like, for example, remote location of copies or tape archives copies. These capabilities may also have scheduling and synchronizing information that may allow complete policies to be defined and associated with individual data units or sets of data units.

Therefore, the present invention anticipates future requirements by matching the definition associated with a data unit to a logical device definition with expanded capabilities, for example, using multiple sets of stripe groups to effect the availability of providing at a later date the performance of wider stripes than originally implied by the performance requested, using more layers or copies of redundancy data to later provide the ability to improve the reliability when specifications change and become higher than originally required, and actually making additional copies of the data on devices that employ different technologies possibly even in remote locations.

Figure 4:
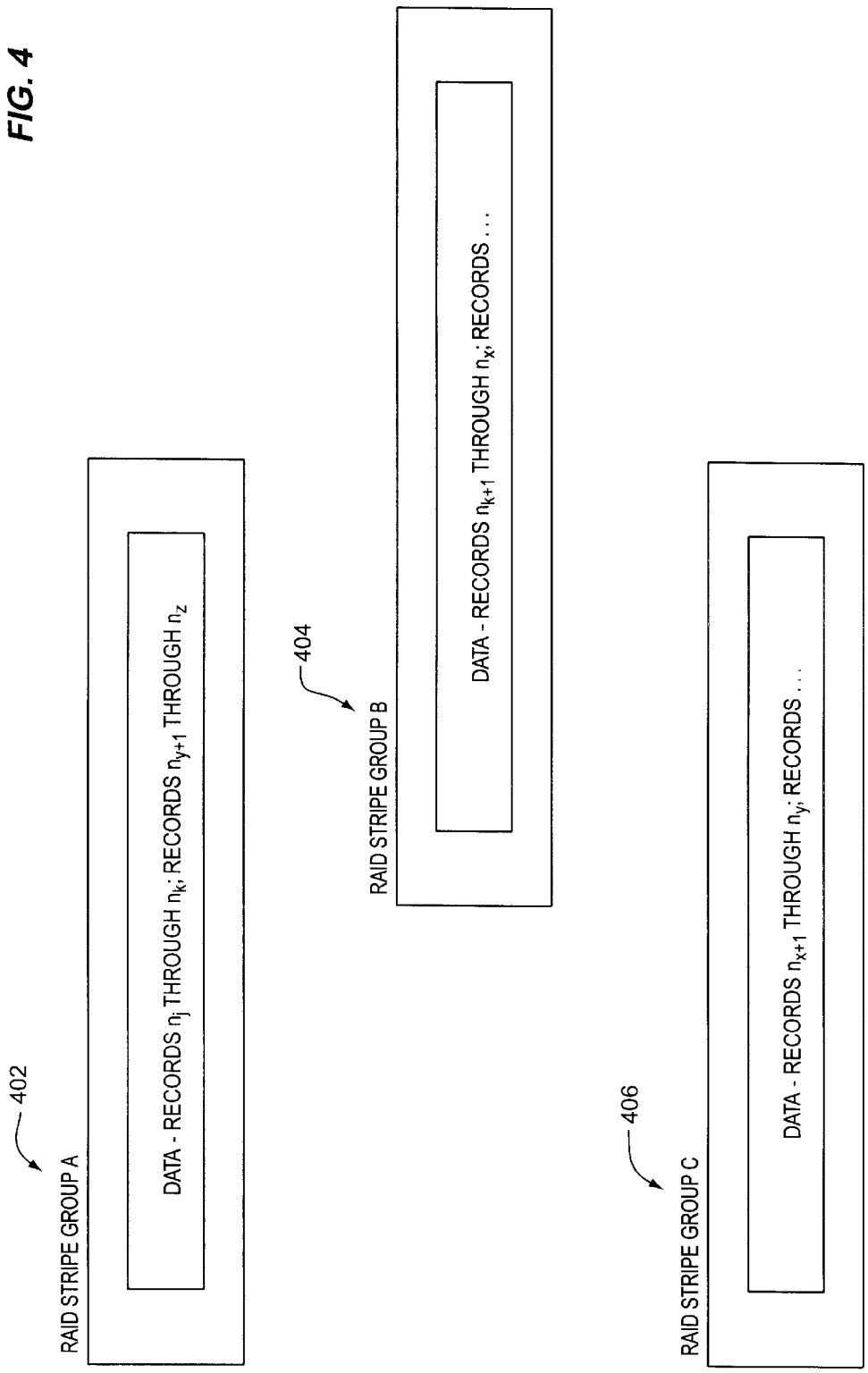
FIG. 4 is an illustration of the use of multiple RAID groups for providing potential for future higher performance requests in accordance with a preferred embodiment of the present invention.

FIG. 4 is an illustration of the use of multiple RAID groups for providing potential for future higher performance requests in accordance with a preferred embodiment of the present invention. FIG. 4 shows the use of multiple RAID groups where data may be read in parallel for records $n_j$ through $n_k$ from RAID stripe group A 402 and then records $n_{k+1}$ through $n_x$ may be read in parallel from RAID stripe group B 404 and then records $n_{x+1}$ through $n_y$ may be read in parallel from RAID stripe group C 406 and then cycling back to RAID stripe group A 402 for the next set of records $n_{y+1}$ through $n_z$. Later if performance requirements demand higher throughput records $n_j$ through $n_x$ may be read in parallel from RAID stripe group A 402 and RAID stripe group B 404 simultaneously or records $n_j$ through $n_y$ from RAID stripe group A 402, RAID stripe group B 404, and RAID stripe group C 406 simultaneously. All RAID stripe groups may be read at once up to the point of anticipated performance requirements. If all RAID stripe groups are read at once, but the system does not meet a newly imposed performance requirement, then the data may be rewritten to a higher performance capability. The present invention also provides a facility for reviewing and modifying or adjusting the interpretation of "appropriate" data storage characteristics after the data element has already been stored. The specific way in which the host systems use the data will imply additional requirements initially not specified. These new requirements may be added to the overall specification and the implementation changed to accommodate the changes.

For example, the characteristics for a data unit may be historically maintained in a meta-data record associated with that data unit and may be updated as the use of the data is monitored. Updates may then trigger subsystem activity to modify the stored characteristics for the data unit. For example, the subsystem may note that a specific portion of the data is referenced in concert with another portion and as a consequence will set staging control metadata that will fetch the anticipated data when the companion data is accessed. In addition, a facility for accepting new specifications for data storage characteristics after the data unit has been stored is provided. The ability for modifying where and/or how an already stored data unit is managed is provided, including, but not limited to the subsystem actually changing where and/or how the associated data elements are stored. The modification of data element storage may be required to meet newly interpreted or specified data unit storage characteristics. When new requirements are imposed on a set of data units and the system has not anticipated the requirements, the present invention builds a new logical device definition from the specified or interpreted data storage characteristics.

Figure 5:
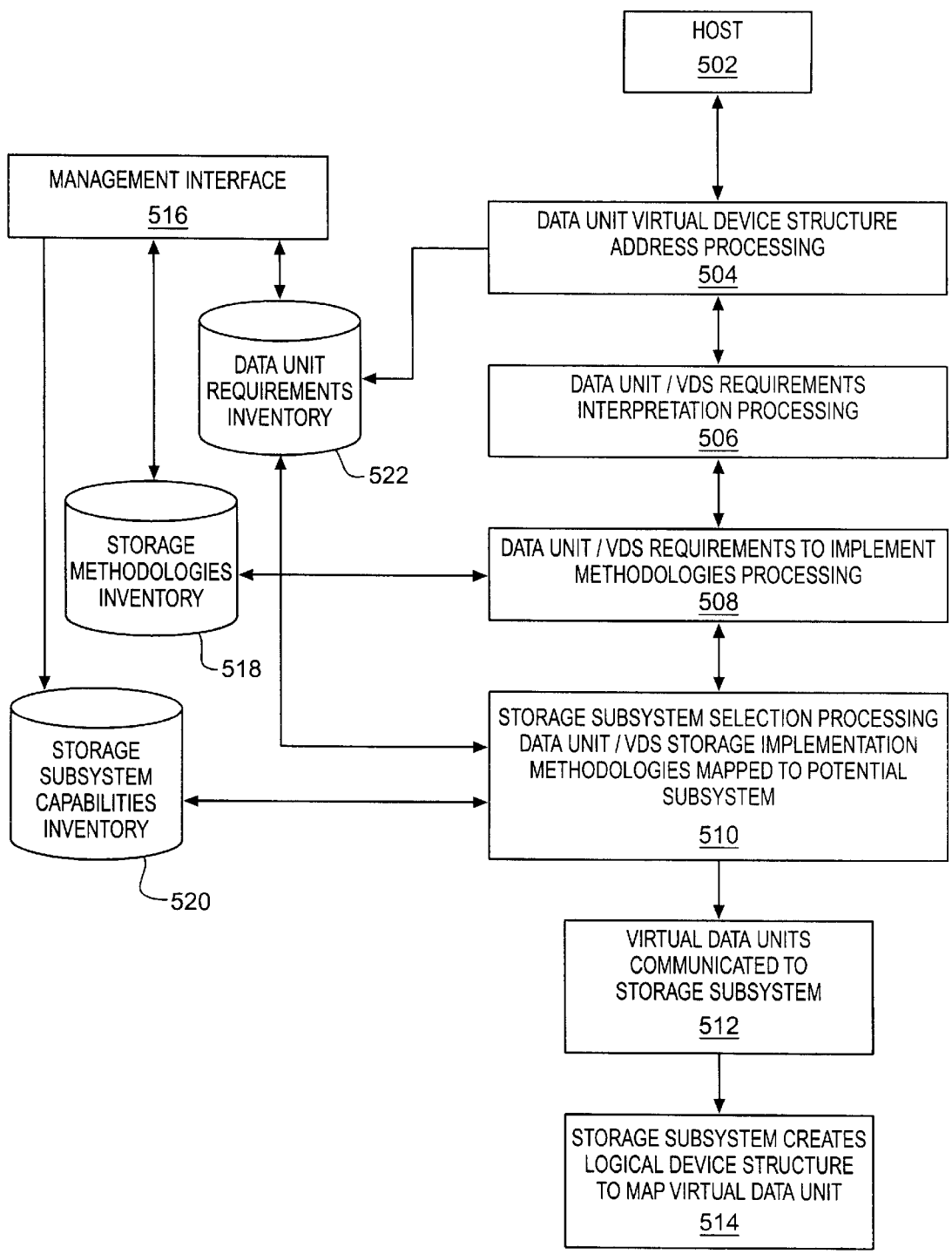
FIG. 5 is a flowchart illustrating a data unit/virtual device structure data processing methodology in accordance with a preferred embodiment of the present invention.

FIG. 5 is a flowchart illustrating a data unit/virtual device structure data processing methodology in accordance with a preferred embodiment of the present invention. A top down approach may be used by building towards characteristics of known physical device types. For a collection of data elements with a virtual data unit address understood by host system (step 502) the data unit virtual device structure address is processed (step 504). The assigned Virtual address communicated to the subsystem may be the same as or different from the virtual data unit address that is known to the host system. The data unit/VDS requirements interpretation is processed (step 506), then the data units/VDS requirements are processed to map methodologies for implementation (step 508). Then the storage subsystem selection processing for the data unit/VDS identifies which storage implementation methodologies are mapped to which potential subsystems and selections for subsystem use are made (step 510). Virtual data units are then communicated to the storage subsystem or subsystems (step 512). Each storage subsystem creates a logical device structure to map the virtual data unit (step 514).

Management interface 516 may manage data unit requirements inventory 522, storage methodologies inventory 518 and receives and provides input from/to storage subsystem capabilities inventory 520. Data unit requirements inventory receives input from data unit virtual device structure address processing (step 504) and storage subsystem selection in processing data unit/VDS storage implementation methodologies when such methodologies are mapped to potential subsystems (step 510). Storage methodologies inventory 518 receives input from data and provides input to data units/VDS requirements to implement methodologies processing (step 508).

With storage virtualization, a host server is freed from the restrictions of actual storage mechanisms. Furthermore, the actual storage mechanism is freed from the restrictions of the presentation to the host server. Data storage is presented to the host server as an emulation of some device or media type or model. The data may actually be stored on one or more different types of devices and/or media. While storage management is concerned with physical characteristics of storage systems, devices and media, storage virtualization is concerned with masking the physical characteristics of storage systems and taking the control of these physical characteristics from the user or system administrator.

Figure 6:
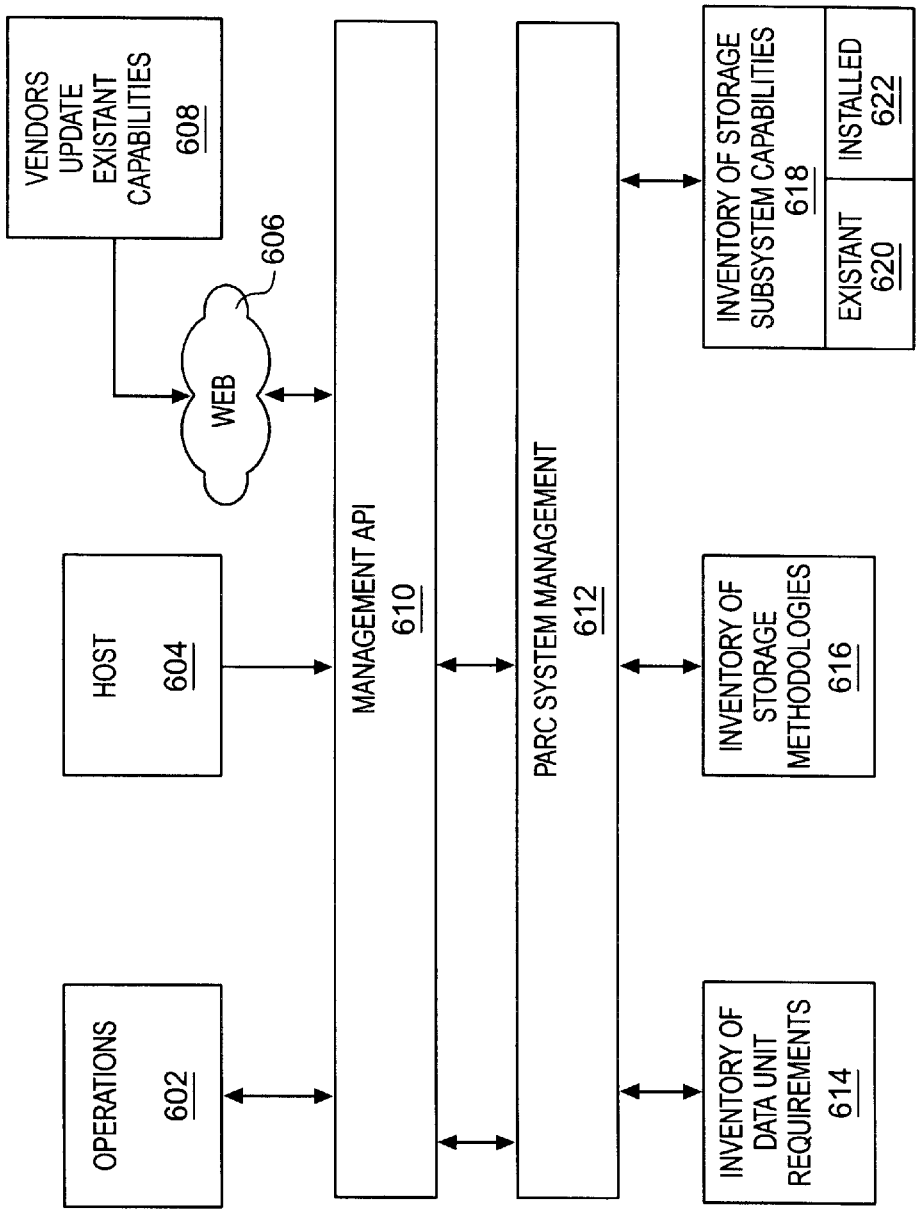
FIG. 6 is an exemplary block diagram of the management API branch illustrated in FIG. 5 in accordance with a preferred embodiment of the present invention.

FIG. 6 is an exemplary block diagram of the management API branch illustrated in FIG. 5 in accordance with a preferred embodiment of the present invention. In this example, Management API 610 may receive input from operations 602, host 604 or through vendors updating existent capabilities 608, which may be via a distributed data processing system, such as, for example, internet 606. PARC system management 612 provides input and provides output to/from management API 610. PARC system management 612 receives input from inventory of data unit requirements 614 along with inventory of storage methodologies 616 and inventory of storage subsystem capabilities 618. Inventory of storage subsystem capabilities may be made up of existent storage subsystem capabilities 620 and installed storage subsystem capabilities 622. If a data unit requirement or a storage methodology requires a particular storage subsystem capability, it needs to be determined as to whether the storage subsystem capability actually exists and, if so, whether the capability is actually installed on an available subsystem. If the storage subsystem capability is actually installed on an available subsystem, the required capability may be provided to satisfy data unit requirements 614 and/or implement a storage methodology 616. However, if the data unit requirement or the storage methodology finds no capability existent within the inventory of storage subsystem capabilities, the data unit requirement and/or the storage methodology may request updates to subsystem capabilities 618 by way of vendor update existent capabilities 608.

Furthermore, operations may be advised when existent capabilities provide a superior solution over that provided by the installed capabilities. Operations may also be informed when no solution is available utilizing the installed capabilities but may be made available via existent but not installed capabilities. Then operations may be advised when no solution may be found for the stated requirements.

Figure 7:
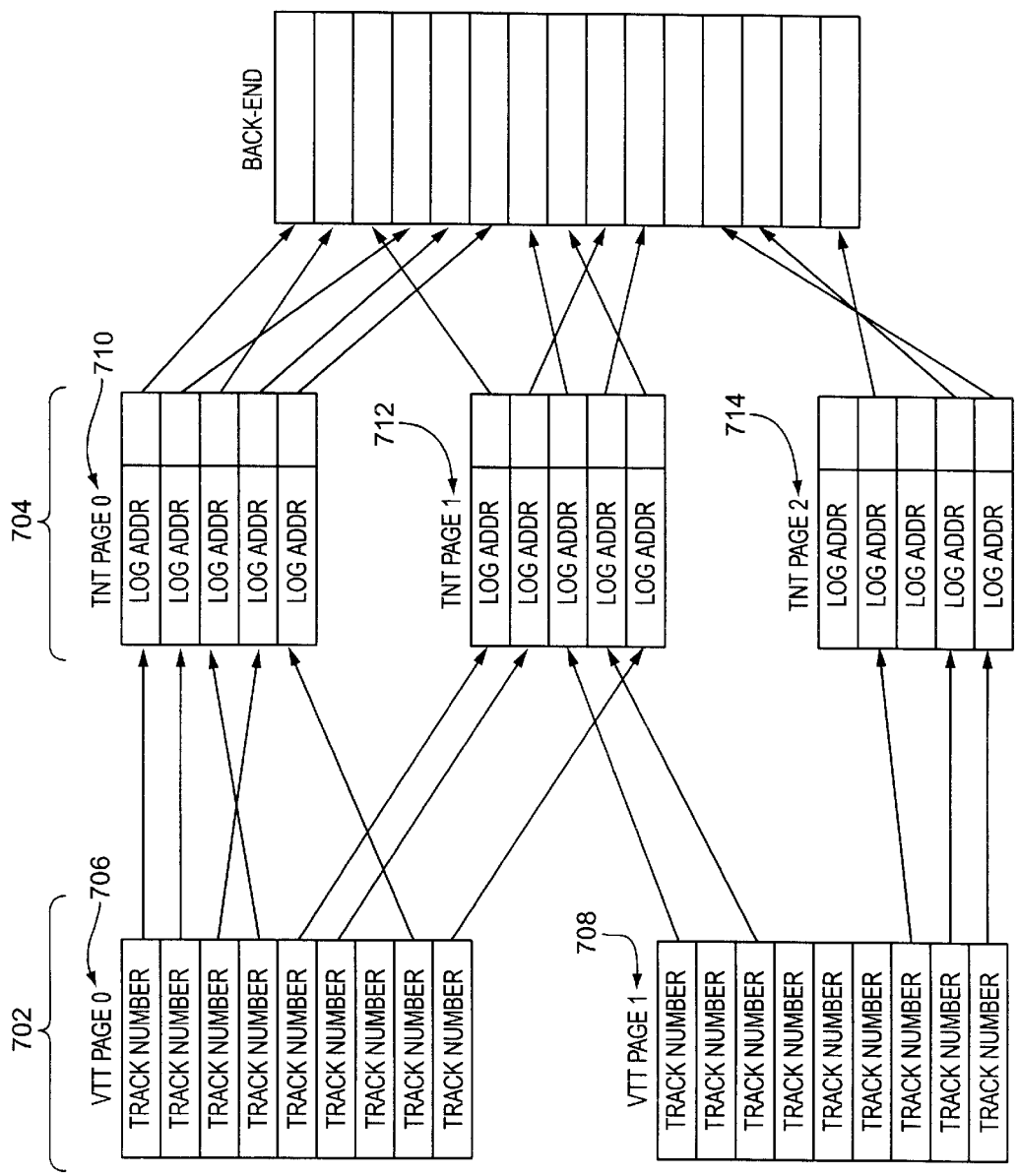
FIG. 7 is an exemplary diagram of a virtual track table and a track number table.

FIG. 7 is an exemplary diagram of a virtual track table and a track number table. Virtual track table 702 and track number table 704 are tables that may be used in a storage subsystem by a processor, such as processors 210–224 in FIG. 2. Some of the mapping schemes force the manipulation of many pointers in order to perform operations on large sets of mapped data. Some mapping schemes also force the allocation of mapping tables for all possible virtual addresses whether or not those addresses are actually used. FIG. 7 depicts prior art which is extended by the present invention.

The present invention also provides a system using a multi-layer virtual mapping tree method that provides very fast access to the mapped data locations and still minimizes the storage required for the mapping tables themselves. The multiple-layer tables allow fast lookup algorithms, but may allow only the mapping table units that point to allocated storage units to be instantiated, therefore, saving mapping table space. These multi-layer mapping tables, in the case of data copies, also allow only the mapping table units for changed data to be instantiated, again saving mapping table space.

In addition, the present invention provides for using a hidden copy/snap copy scheme where the mapped units that are involved in the snap copy are tracked in multiple ways, for example using bit maps, pointer tables, and multi-layer bit maps, thereby reducing the table entries to be manipulated to perform snapshot-like operations. An improvement for some workloads and types of data is to use dynamically assigned pointer ranges to track the snap copy data, thereby possibly using less storage than bit maps. Furthermore, the present invention provides using manipulation of entire sections (i.e. subtrees) of the multi-layer virtual mapping tree to speed up operation on large sets of data and to allow additional functions that may be time consuming using other methods.

To achieve the above objectives of the present invention, the original multi-layer map tree may be modified to add map table meta-data. After modification of the original multi-layer map tree a map table section separation may be performed both in the horizontal and vertical directions. Also, the operations of promoting and demoting sections of the map table (subtrees) may be added. Therefore, this gives the present invention the added flexibility of operation and increased access to data locations while saving on map table space.

The present invention manages virtual storage facilities comprising an organization of computer equipment, for example, a host network, data transfer means, storage controller means and permanent storage means and attachment means connecting these devices together. The computer storage subsystem may be organized using multiple layers of mapping tables which may provide unique identification of the storage location of the data such that individual entries in the mapping tables are variable and may be made self-defining with respect to the amount of data managed. The layers of the tables are variable and may be made self-defining as to existence and may be implemented on a piecemeal basis. The existence of individual tables or parts of individual tables is variable and such that actual presence of any of the table information is by demand.

The present invention may also further include a range of data wherein the range of data management is correlated to the layer of the mapping tables addressed. The coordination may be, for example, an algorithm, via a pointer system, via a pointer to correlation logic or via a tree structure. The range of data managed may also be independent of the layer of the tables accessed. Mapping consistency is managed algorithmically or mapping consistency is managed via pointers to boundary information. The boundary information may include, for example, description of size of data units mapped, a description for a like set of entries, a unique description for each entry, a specified default size for a set of entries, including exception flags for modified entries and a bit map. The description of the size of the data units mapped may be by way of a pointer with an address range or a pointer with a unit size. Mapping consistency may be managed via a combination of algorithms, boundary information, and pointers to boundary information. Multiple layers may include a first level of management directing to one or more intermediate levels of management, thereby directing to a final level of management, which may provide the necessary controls to directly access the data. A means to indicate that the virtual address space mapped by an entry is not known, not used or not allocated may also be included. Therefore, individual tables in the mapping may then be able to be paged to secondary storage and brought into primary storage when needed. Tables for unallocated space may not be instantiated at all until the unallocated space is used or allocated. Boundary information may consist of, for example, fixed mapping wherein every entry in the table has the same extent and location which may be computed, variable mapping in which every entry in the table is unique and default variable in which there is a default extent size and a map of which entries are exceptions.

Figure 8:
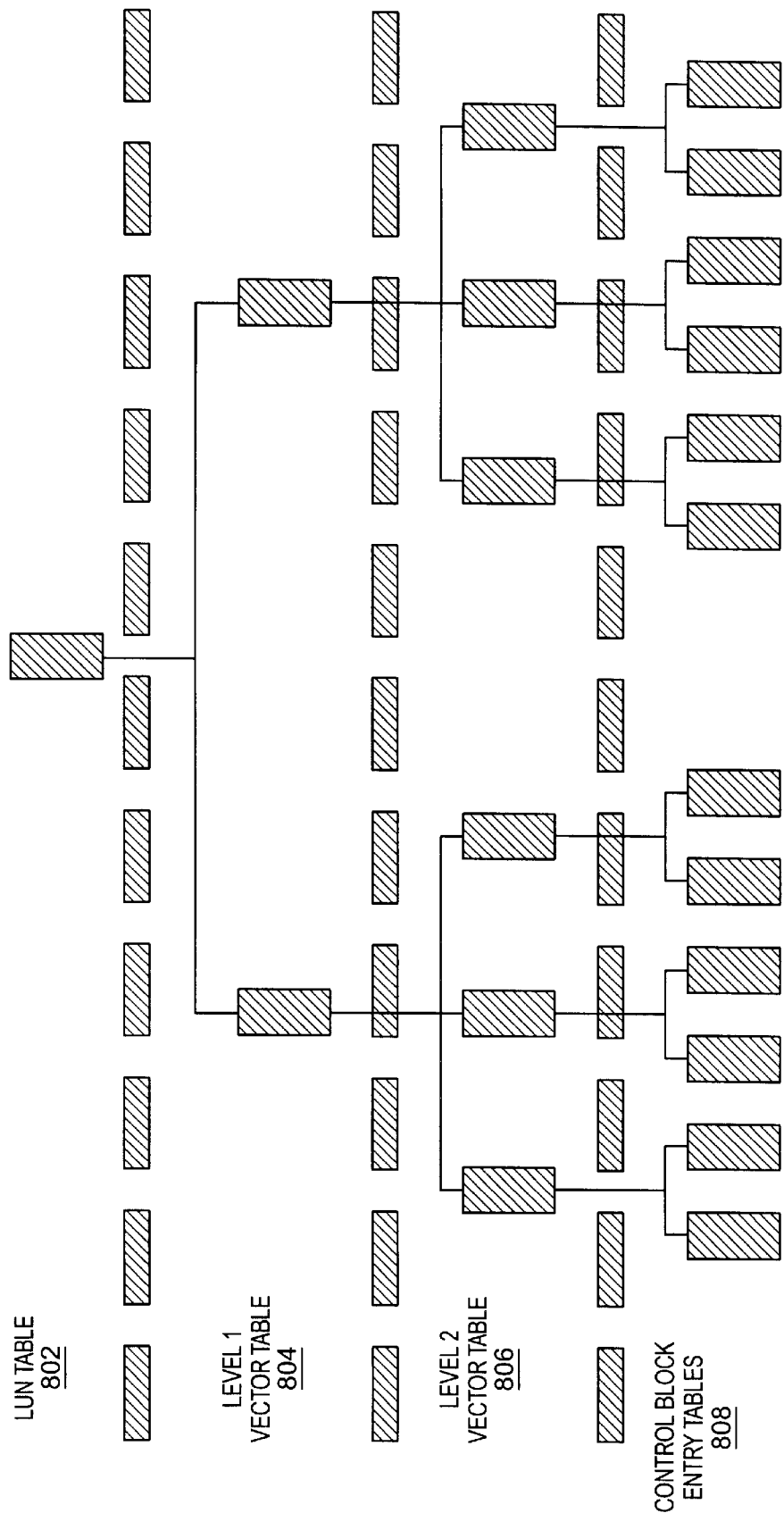
FIG. 8 is an exemplary illustration of a hierarchical relationship of a mapping table in accordance with a preferred embodiment of the present invention.

FIG. 8 is an exemplary illustration of a hierarchical relationship of a mapping table in accordance with a preferred embodiment of the present invention. A map may be made up of several layers. These layers create a hierarchy used to facilitate the location of an entry that may describe the actual location of the data. Each layer points to a finer granularity than the layer below it. For example, the level 1 vector table 804 entries each describe, for example eight gigabytes of a LUN address, each level 1 entry points to level 2 vector table 806 whose entries each describe, for example, eight megabytes of a LUN address. The amount of space required to store layers 802 and 804 is small enough in this example so that dedicated memory may be set aside to hold them, thereby ensuring that any access requiring data stored in either level 802 or 804 will be found. Therefore, hits at these levels (802 & 804) will speed the processing of the mapping tables.

In this example, LUN table 802 is a vector table with, for example, 256 entries, in which LUN table 802 is indexed by combining target and LUN addresses. There is one entry for each target and LUN combination. The entry contains a vector to the next table in level 1 vector table 804 layer or contains a null value if no target address of LUN address has been created. LUN table 802, in this example, requires 1024 bytes of memory. LUN table 802 may be pinned in memory.

Level 1 vector table 804 contains, in this example, 256 entries that represent the LUN eight gigabyte segments. Level 1 vector table 804 is indexed by using the most significant byte or bits 31–24 of the logical block address. Each entry either contains a vector to level 2 table 806 or contains a null value. While the space to store all the level 1 804 pointers is reserved, in this example, for 256 entries, level 2 table 806 is only populated with enough entries to represent the size of the host LUN. That is, if the host LUN has a capacity of, for example, 50 gigabytes, there may be seven entries in level 1 vector table 804. Level 1 vector table 804 requires, for example, up to 256K of memory. Level 1 vector table 804 is also pinned in memory.

Level 2 vector table 806 contains, in this example, 1024 entries and is indexed by bits 23–14 of the logical block address. The entries in level 2 vector table 806 may contain either a pointer to a control block table or a null value. As each level 2 vector table 806 represents, for example, eight gigabytes of LUN address, a null value may be present for addressed that exceed the capacity of the LUN up to, for example, eight gigabytes of boundary. Each entry in level 2 vector table 806 represents, for example, eight megabytes of LUN address. Level 2 vector table 806 may require, for example, 4096 bytes of memory and is pageable. Level 2 vector table 806 may have a higher priority than control block table 808 and may only be swapped out of the table memory space to make room for more table information when necessary (i.e., when no lower level table information is available to be swapped out).

The lowest layer, in this example, in the map is control block table 808. Control block table 808 is made up of, for example, 256 control block entries. Bits 13–6 of the logical block address are used as an index into control block table 808. Control block table, in this example, represents eight megabytes of the LUN address. Each control block table 808 requires, for example, 4096 bytes of memory. Control block table 808 is pageable and may have a lower priority than level 2 vector table 806 and may be swapped out of the mapping table memory space to make room for more entries (e.g., other level 808 entries) before level 2 vector table 806 is swapped. Control block table 808 may be swapped on a LRU basis.

Figure 9:
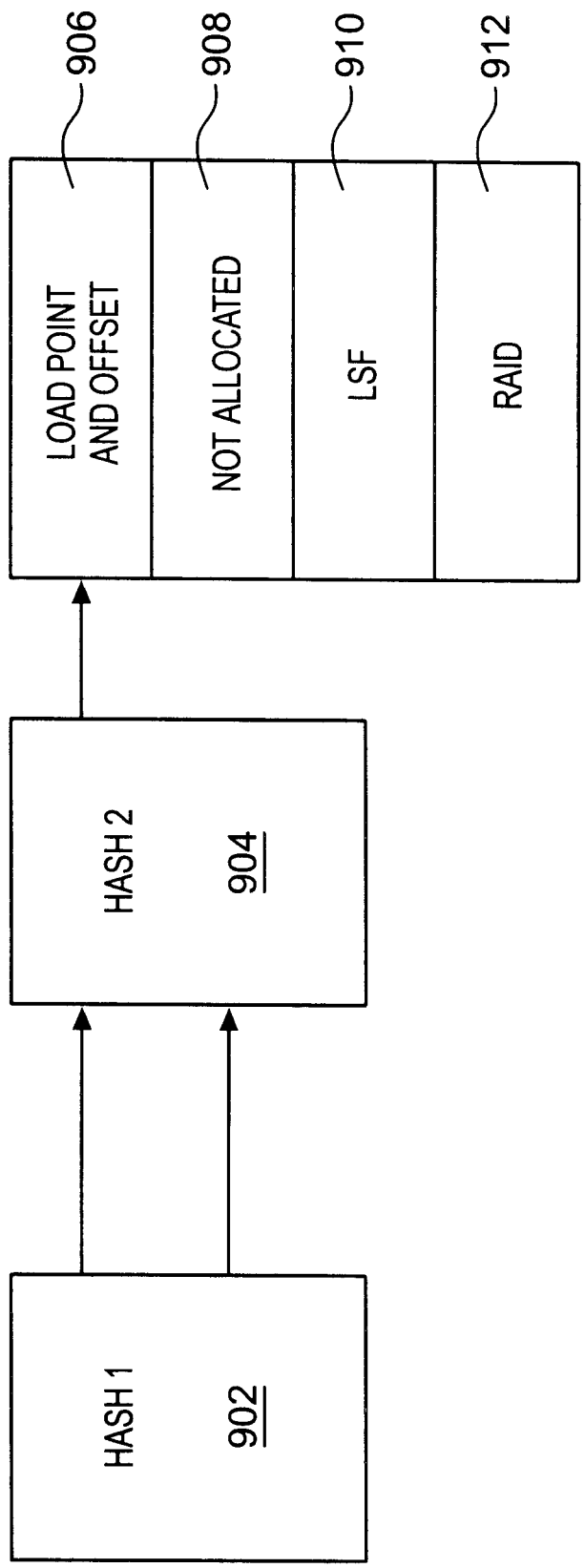
FIG. 9 is an exemplary diagram of a portion of a mapping table describing an address range with four distinct sections in accordance with a preferred embodiment of the present invention.

FIG. 9 is an exemplary diagram of a portion of a mapping table describing an address range with four distinct sections in accordance with a preferred embodiment of the present invention. Hashing algorithms are a well known mechanism for storage subsystems to manage space and resolve an input address to a physical storage location. Hash algorithm 1 902 and hash algorithm 2 904 are serially implemented algorithms that may be used in a storage subsystem by a processor, such as processors 210–224 in FIG. 2. Hash 2 algorithm 904 may resolve to several sections. Each section may in turn be mapped using different mapping techniques, such as, for example, load point and offset section 906, not allocated section 908 logged structured file (LSF) section 910 and RAID section 912.

Figure 10:
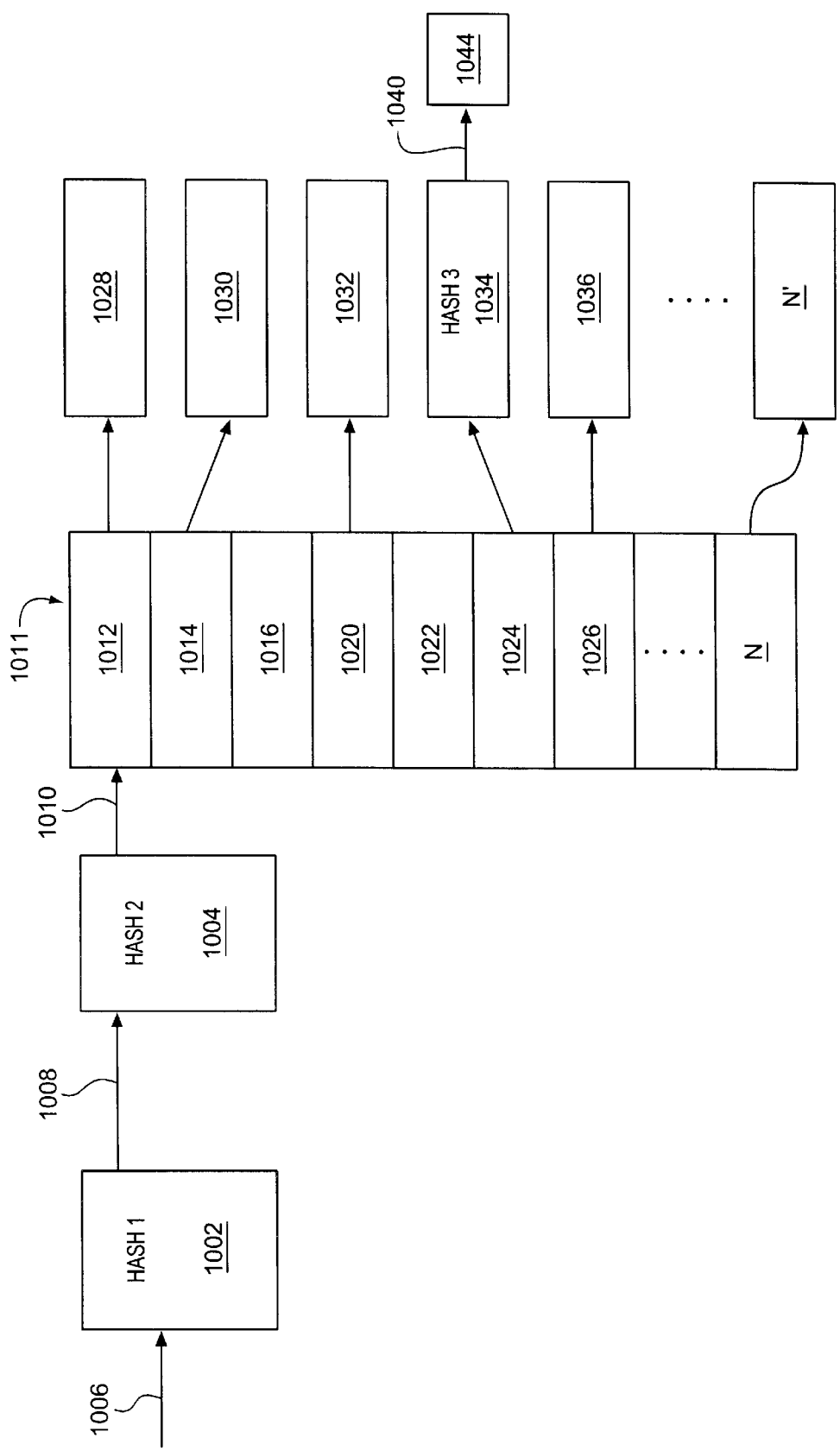
FIG. 10 is an exemplary block diagram of a multi-layer mapping table in accordance with a preferred embodiment of the present invention.

FIG. 10 is an exemplary block diagram of a multi-layer mapping table in accordance with a preferred embodiment of the present invention. Hash algorithm 1 1002 produces hash values as output. Logical address in 1006 is input into hash table 1002. Hash algorithm 1 1002 may not require modification due to dynamic changes to the mapping. Hash algorithm 1 1002 may only need modification to reflect logical device definition changes. Hash value out 1008 is input into hash algorithm 2 1004. Hash algorithm 2 1004 may be modified as the mapping changes. Hash value output 1010 from hash algorithm 2 1004 is input into pointer table 1011. Pointer table 1011 consists of pointer entries 1012-N. The pointer changes as the mapping changes. Hash algorithm 2 1004 and pointer table 1011 are held consistent with respect to range. Also included are mapping table endpoints 1028, 1030, 1032, 1034, 1036 and N'. Mapping table endpoints 1028-N' can be omitted, for example, in the case of unallocated space. Mapping table endpoints 1028-N' may be a single entry or a complex set of entries and further logic, for example, such as hash algorithm 3 1034 which produces hash output 1040 which is an input to hash table 1044. The total number of mapping table entry points may vary dynamically during use as the table entries are modified.

The present invention comprises placing dynamically allocated and assigned pointers, and associated data structures, behind an algorithmically discovered internal mapping system which is already in place in components of current storage subsystems. An example of such a system is one that is used for identifying extent boundaries for read and write authorization controls, another is one that is used to compensate for when a particular physical location is no longer usable. In current disk drives, the use of dynamic mapping to mark data (D-Mark) is such a potential mapping system. In current tape storage, the use of Erase-gap is also such a potential mapping system. When a tape drive within a tape subsystem encounters a section of tape that will not store data, the subsystem will execute an error recovery routine known as "erase gap". In that routine, a physical section of the tape is marked at the beginning and end with what is known as "erase gap tone", which is a signal that is different from data signals. The entire section is then skipped over when reading or writing data in normal processing. The pointer for virtualization can be stored in the section that is skipped over and a knowledgeable device can retrieve them and use them for indirection in processing.

The pointers and data structures provide indirection and logic needed for navigating among virtual, logical, and physical entities in order to read or write data or for on-demand copies. Indirection provides a means of accessing routines and objects that continually change physical location. The initial routine points to a place in a storage device, that place points to another place, etc. In the example used to demonstrate the present approach, the D-Mark mechanism becomes an indirect pointer for locating the subset of pointers used for a particular copied area.

Figure 11:
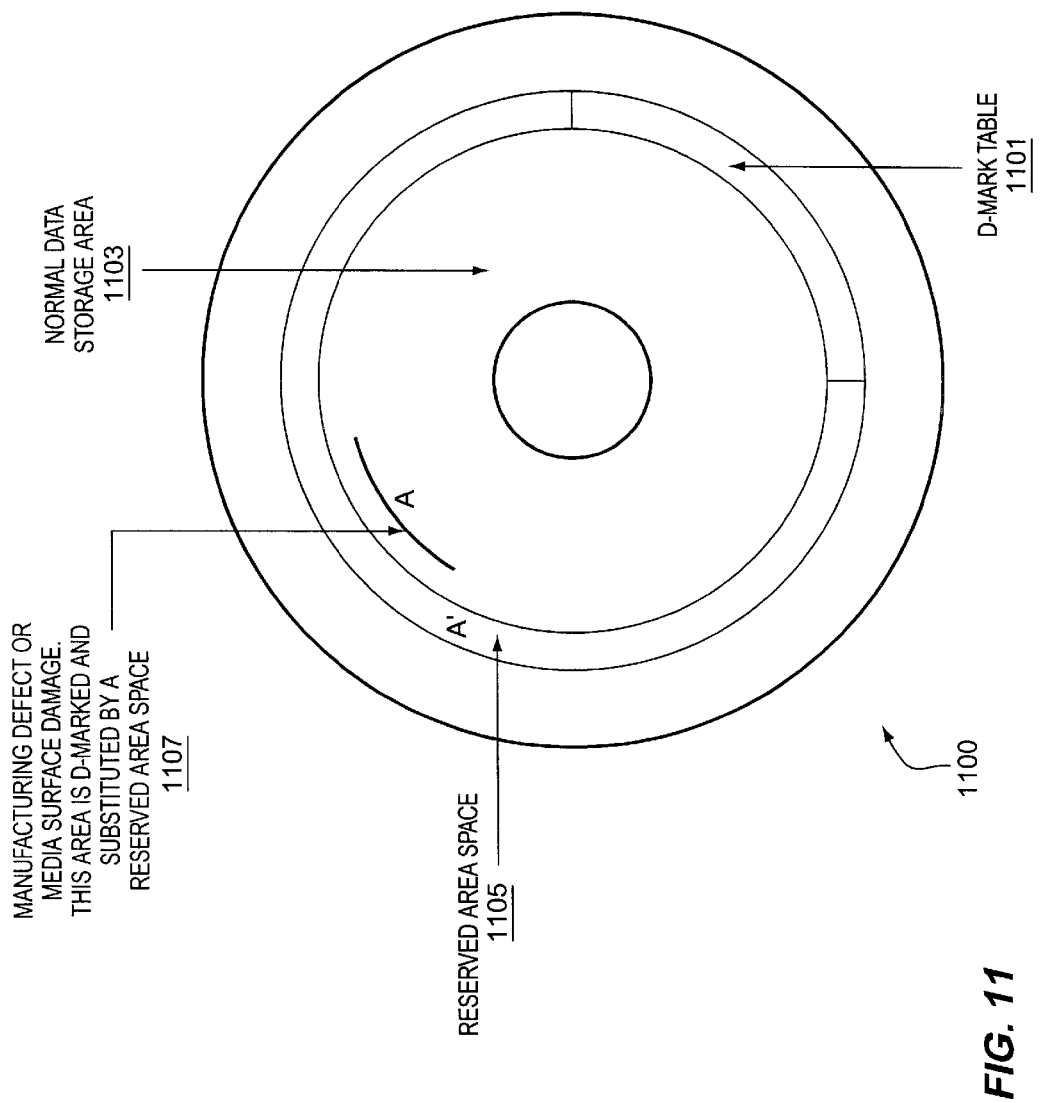
FIG. 11 depicts a schematic diagram illustrating the implementation of D-Mark as in current disk drives.

Referring now to FIG. 11, a schematic diagram illustrating the implementation of D-Mark as in current disk drives is depicted. The disk would normally store data on the surface within the band marked as Normal Data Storage Area 1103. When the disk identifies an area within this band that is not capable of retaining data for storage (position A in defect 1107), the area is mapped out of service and that address for data storage is physically located elsewhere. Specifically, it is placed in the Reserved area space 1105 at position A'. The area that cannot retain data could have been a manufacturing defect or could have been physically damaged subsequent to manufacture. The new location of A' is maintained in the D-Mark table 1101 and accessing is accomplished by indirectly addressing the original space through this table. It must be noted that all storage devices have a mechanism to isolate a section of storage and execute some logic in relation to that storage such as to substitute another section of storage.

Figure 12:
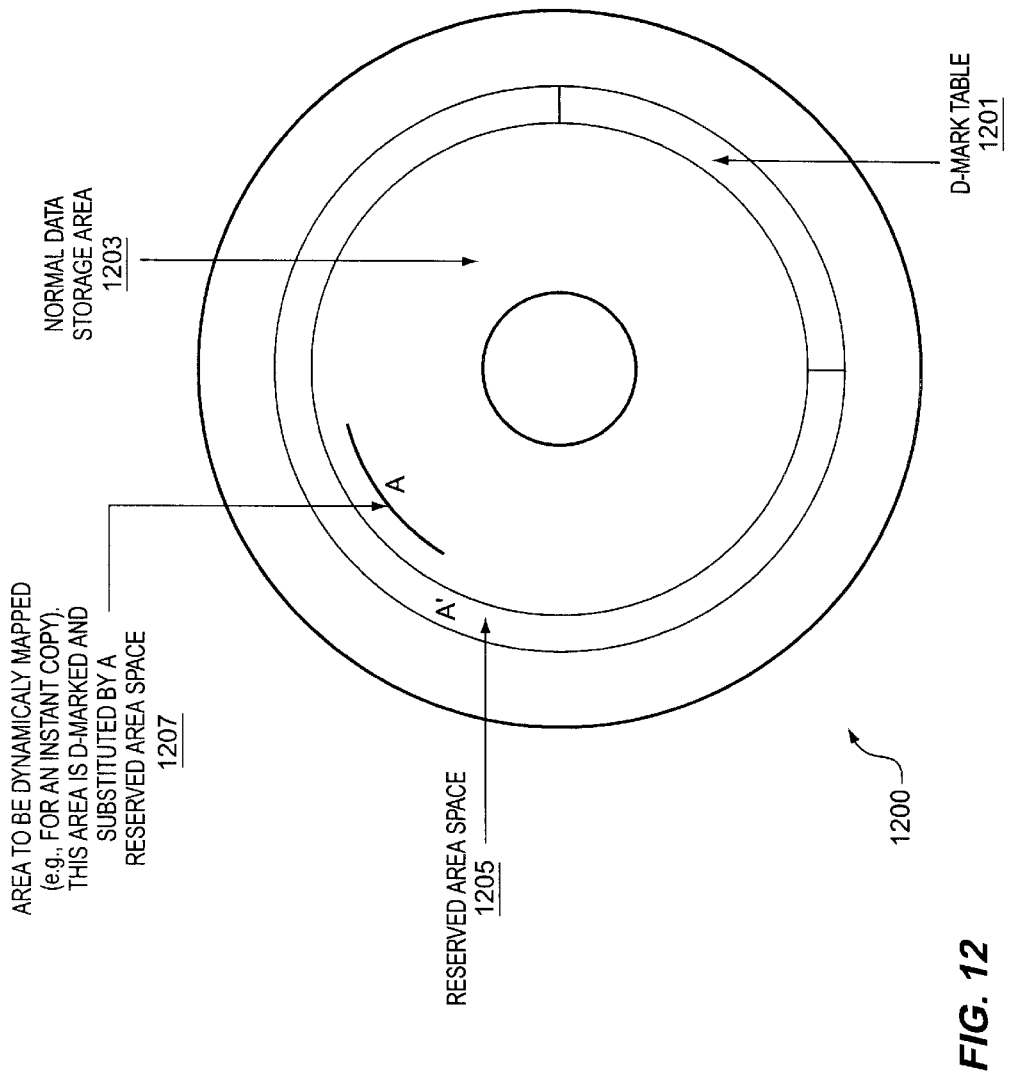
FIG. 12 depicts a schematic diagram illustrating an example of using a mapping routine already in a device to store dynamic mapping pointers, in accordance with the present invention.

Referring now to FIG. 12, a schematic diagram illustrating an example of using a mapping routine already in a device to store dynamic mapping pointers is depicted in accordance with the present invention. The system used is D-Mark as shown in FIG. 11, but the area of interest is not one that has physical damage, but one that has been marked for an instant copy operation. A small piece of the recorded data 1207 noted as section A of the storage device 1200 is D-Marked, and a flag is placed in the D-Mark table 1201 to identify that the new location for dynamic mapping is at reserved section A'. This may include a pointer to some additional mapping logic. A D-Mark table 1201 identifies both the D-Marked section A and substitute reserved section A'. In this way, write commands to section A will be redirected to section A' as appropriate. When writes are directed to the original data, they can be directed through the D-Mark to the original storage at A. If the writes are directed to the copy of the data, they can be directed via the D-Mark to the reserve area A'. There are situations when the system should use the reverse approach. If the majority of the activity was directed to the copy, the process would run more efficiently if the copy data was accessed directly and the original data was accessed through indirection. The primary concern is that the operations be managed in a consistent manner.

Without D-Marking, a write request to old data would require five steps:

1. write the new block to a side file;
2. read the old data;
3. write the old block to the copy destination;
4. read the new block from the side file; and
5. write the new block to the real location With the D-Mark mechanism, this process is reduced to two steps:

1. D-Mark the old data location and point to the side file; and
2. write the new block to the side file.

The present process is also improved if the D-Mark can be qualified by a virtual volume ID.

After the new data is written, a housekeeping operation is performed in which either the new data is moved to another location, or the D-Marked block is put back to its original location.

The housekeeping operation can involve an initiation point that has an algorithmic method to find data. One part of housekeeping is to establish new initiation points so all data can be found algorithmically, instead of following D-Mark pointers. When performing a snap, new initiation points can be established immediately to determine where the data will be initially placed. The D-Mark can then be made to point to the new initiation point location. The copy operation would then be:

read the source write the destination

D-Mark the source

The reconciliation operation in the housekeeping can have a moving lower boundary for using the new initiation point. The old initiation point may be D-Marked, and the new initiation point would be a boundary for where the old would have to be used, versus using the new point. In the D-Mark process, the old data has only one initiation point, whereas the new data has two initiation points. After reconciliation is complete, only one initiation point remains, and is associated with the new data. However, if a snap is performed to something that has both an old and a new initiation point, a problem arises as to which D-Mark to follow. To resolve the problem, subsequent snaps point to previous snaps to resolve multiple D-Marks. Because of many writes, the side file becomes the bulk of the data that is valid, and old data is reconciled to the side file initiation point. A reconciliation reversal can be performed in which the old data is sent to the side file and the old initiation point is given to the snap to administer, with the snap having little data on its new initiation point. To shorten the D-Mark list, the data is copied up the stream of snaps and the multilevel D-Marks are forward carried with it.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dynamically mapping data in a computer storage subsystem, comprising:

using a recovery mapping mechanism to mark a first location within a particular storage device, said recovery mapping mechanism designed for indicating a portion of a storage device and associating a substitute portion of said storage device to use as substitute storage in place of said indicated portion, wherein requests to access said indicated portion are rerouted by said recovery mapping mechanism to said substitute portion;

associating, using said recovery mapping mechanism, a substitute location with said first location;

storing dynamically allocated pointers in said substitute location; and utilizing said recovery mapping mechanism to locate said dynamically allocated pointers, wherein said substitute location is used to store pointers instead of being used as a substitute storage location for said first location.

2. The method according to claim 1, further comprising the steps of:

receiving, by said recovery mapping mechanism, a request to access said first location;

routing, by said recovery mapping mechanism, said request to said substitute location; and providing said dynamically allocated pointers to said request.

3. The method according to claim 1, further comprising the step of:

storing dynamically allocated pointers in said substitute location, wherein said pointers are virtualization pointers used during a conversion between physical addresses and virtual addresses.

4. The method according to claim 1, further comprising the steps of:

utilizing said recovery mapping mechanism as an indirect pointer to said dynamically allocated pointers.

5. The method according to claim 1, further comprising establishing an initiation point for storing an algorithm which locates data, wherein said algorithm is stored starting at said initiation point.

6. The method according to claim 5, further comprising:

establishing said initiation point upon creation of a snapshot copy of a data file; and storing a pointer to said initiation point in said substitute location.

7. The method according to claim 1, wherein the recovery mapping mechanism is used to indicate a portion of a storage device that is not capable of storing data.

8. The method according to claim 7, wherein the recovery mapping mechanism is a dynamic marking (D-mark) mechanism.

9. The method according to claim 7, wherein the recovery internal mapping mechanism is an Erase-gap mechanism, wherein said Erase-gap mechanism identifies a particular section of a tape by marking a beginning point and an end point, wherein a gap is defined between the beginning point and the end point.

10. A computer program product in a computer readable medium for use in a data processing system, for dynamically mapping data in a computer storage subsystem, the computer program product comprising:

instructions for using a recovery mapping mechanism to a first location within a particular storage device, said recovery mapping mechanism designed for indicating a portion of a storage device and associating a substitute portion of said storage device to use as substitute storage in place of said indicated portion, wherein requests to access said indicated portion are rerouted by said recovery mapping mechanism to said substitute portion;

instructions for associating, using said recovery mapping mechanism, a substitute location with said first location;

instructions for storing dynamically allocated pointers in said substitute location; and instructions for utilizing said recovery mapping mechanism to locate said dynamically allocated pointers, wherein said substitute location is used to store pointers instead of being used as a substitute storage location for said first location.

11. The computer program product according to claim 10, further comprising:

instructions for receiving, by said recovery mapping mechanism, a request to access said first location;

instructions for routing, by said recovery mapping mechanism, said request to said substitute location; and instructions for providing said dynamically allocated pointers to said request.

12. The computer program product according to claim 10, further comprising:

instructions for storing dynamically allocated pointers in said substitute location, wherein said pointers are virtualization pointers used during a conversion between physical addresses and virtual addresses.

13. The computer program product according to claim 10, further comprising:

instructions for utilizing said recovery mapping mechanism as an indirect pointer to said dynamically allocated pointers.

14. The computer program product according to claim 10, further comprising instructions for establishing an initiation point for storing an algorithm which locates data, wherein said algorithm is stored starting at said initiation point.

15. The computer program product according to claim 14, further comprising:

instructions for establishing said initiation point upon creation of a snapshot copy of a data file; and instructions for storing a pointer to said initiation point in said substitute location.

16. The computer program product according to claim 10, wherein the recovery mapping mechanism is used to indicate a portions of a storage device that is not capable of storing data.

17. The computer program product according to claim 16, wherein the recovery mapping mechanism is a dynamic marking (D-mark) mechanism.

18. The computer program product according to claim 16, wherein the recovery mapping mechanism is an Erase-gap mechanism, wherein said Erase-gap mechanism identifies a particular section of a tape by marking a beginning point and an end point, wherein said gap is defined between the beginning point and the end point.

19. A system for dynamically mapping data in a computer storage subsystem, comprising:

a recovery mapping mechanism to mark a first location within a particular storage device, said recovery mapping mechanism designed for indicating a portion of a storage device and associating a substitute portion of said storage device to use as substitute storage in place of said indicated portion, wherein requests to access said indicated portion are rerouted by said recovery mapping mechanism to said substitute portion;

said recovery mapping mechanism for associating a substitute location with said first location;

storing means for storing dynamically allocated pointers in said substitute location; and said recovery mapping mechanism for locating said dynamically allocated pointers, wherein said substitute location is used to store pointers instead of being used as a substitute storage location for said first location.

20. A method for dynamically mapping data in a computer storage subsystem, comprising:

using a recovery mapping mechanism to mark a first location within a particular storage device for an instant copy operation, said recovery mapping mechanism designed for indicating a portion of a storage device that is not capable of storing data and associating a substitute portion of said storage device to use as substitute storage in place of said indicated portion, wherein requests to access said indicated portion are rerouted by said recovery mapping mechanism to said substitute portion;

receiving a first request to write to original data, said original data being located at said first location;

utilizing said recovery mapping mechanism to map said request to said first location;

receiving a second request to write to a copy of said data, said copy being located at said substitute location; and utilizing said recovery mapping mechanism to map said second request to said substitute location.

* * * * *